United States Patent [19]
Oniki et al.

[11] Patent Number: 5,781,199
[45] Date of Patent: Jul. 14, 1998

[54] PARALLEL PROCESSING METHOD FOR USE WITH GRAPHICS PROCESSOR

[75] Inventors: Kazunori Oniki; Masahiro Shiraishi, both of Hitachi; Koji Ozawa, Hitachiohta; Keisuke Yamane, Yokohama; Shinji Kimura, Sagamihara, all of Japan

[73] Assignee: Hitachi, Ltd., Tokyo, Japan

[21] Appl. No.: 749,193

[22] Filed: Nov. 14, 1996

[30] Foreign Application Priority Data

Nov. 22, 1995 [JP] Japan .................................. 7-304444

[51] Int. Cl.$^6$ .................................................. G06F 15/80
[52] U.S. Cl. .......................... 345/505; 345/196; 345/522
[58] Field of Search ..................... 345/505, 522, 345/506, 196

[56] References Cited

U.S. PATENT DOCUMENTS 5,485,559 1/1996 Sakaibara et al. ...................... 345/433

*Primary Examiner*—Kee M. Tung
*Attorney, Agent, or Firm*—Kenyon & Kenyon

[57] ABSTRACT

A parallel processing method for use with a graphics processor wherein graphics processing is performed by each of configured command processors efficiently in a distributed manner, with a host CPU remaining unaware of the number of command processors. Each command group of a variable length from a host CPU is distributed from an FIFO queue to a plurality of parallelly arranged command processors for parallel processing through any free one of input FIFO queues corresponding to the command processors. Upon command group distribution, an identical serial number is added as a command group serial number to the commands constituting the same command group. The results of processing of individual graphics commands by the command processors are collected via output FIFO queues, which also correspond to the processors, in the order of the command group serial numbers added to the commands before the processed results are graphically drawn.

3 Claims, 7 Drawing Sheets

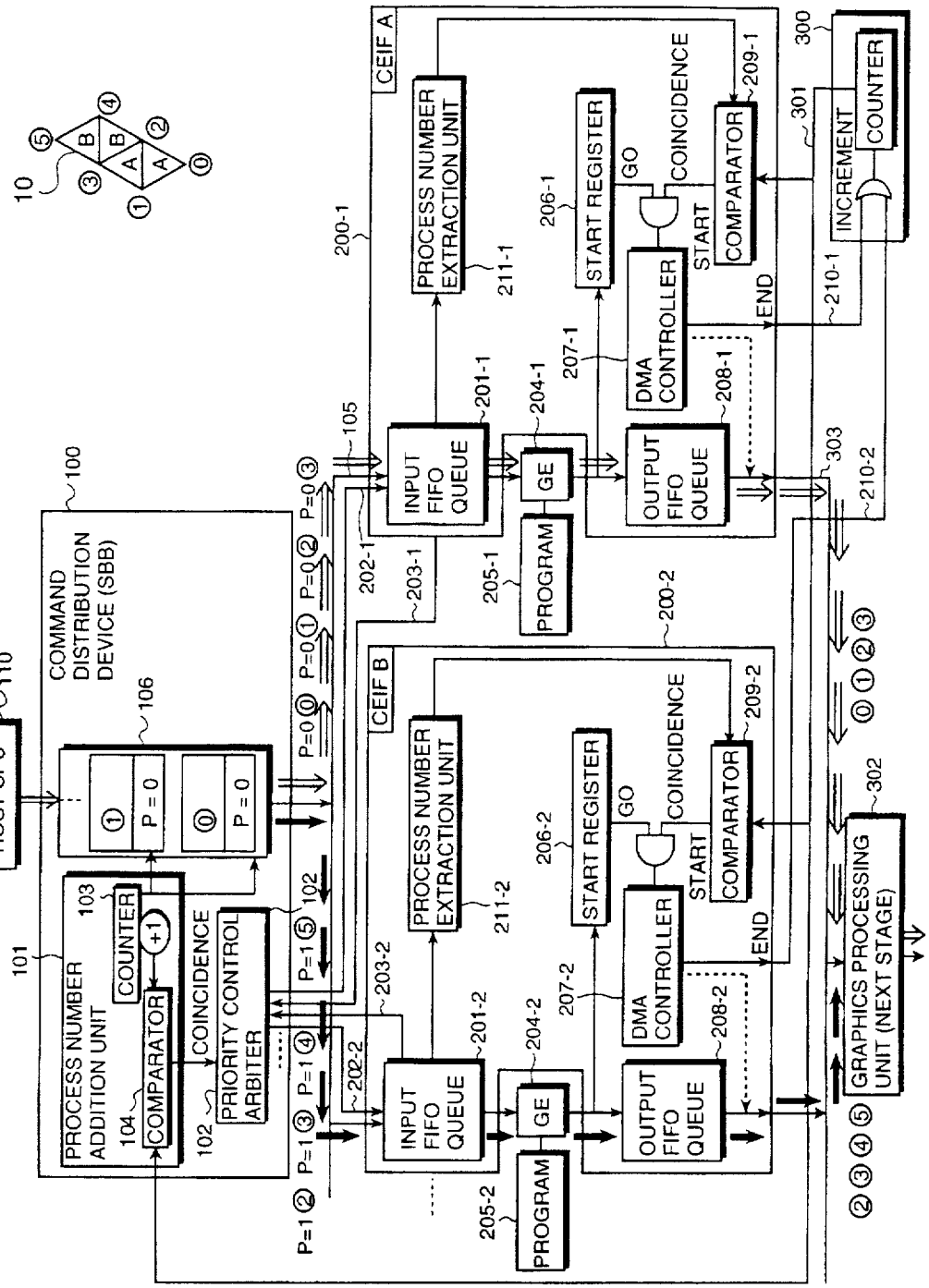

FIG.3A

API-DRIVER INTERFACE

BEGIN (POLYGON)
    POINT 0 ($Vx_0, Vy_0, Vz_0, Nx_0, Ny_0, Nz_0, S_0, t_0$)
    POINT 1 ($Vx_1, Vy_1, Vz_1, Nx_1, Ny_1, Nz_1, S_1, t_1$)
    POINT 2 ($Vx_2, Vy_2, Vz_2, Nx_2, Ny_2, Nz_2, S_2, t_2$)
    .
    .
    .
    POINT 5 ($Vx_5, Vy_5, Vz_5, Nx_5, Ny_5, Nz_5, S_5, t_5$)
END (POLYGON)

FIG.3B

DRIVER HARDWARE INTERFACE

BND POL

POINT 5 DATA IN 32 BYTES

⋮

POINT 1 DATA IN 32 BYTES

POINT 0 DATA IN 32 BYTES

BIGIN POL

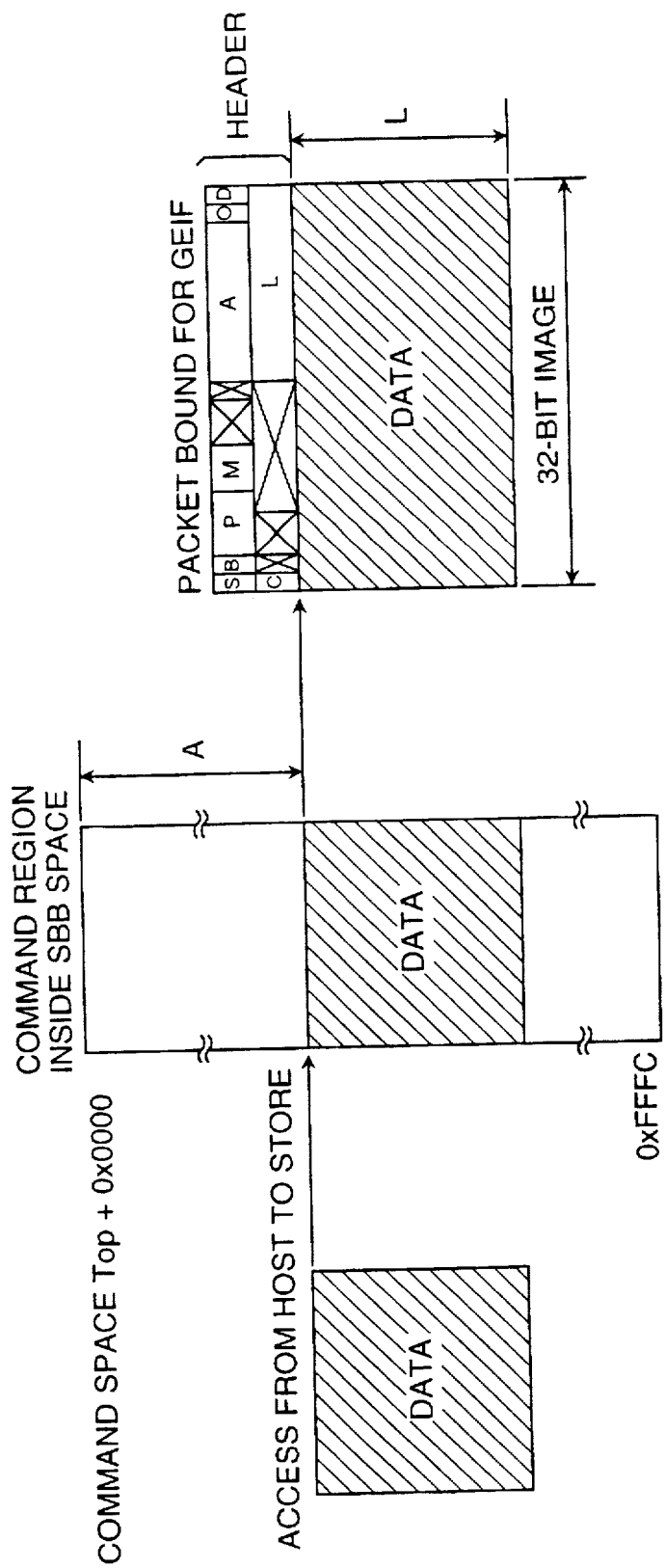

FIG.5

PACKET HEADER FORMAT

```
63 62    48 47        40 39        32 31      24 23      17 16 15      8 7        0
| C |  R  | 0 0 0 0 0 0 | L | 0 | S | B | P | M | R | R | A | O | D |
```

| NO | BIT ABBREVIATION | BIT NAME | BIT WIDTH | DESCRIPTION |
|----|------------------|----------|-----------|-------------|
| 1 | C | CONTINUE | 1 | THIS BIT, INDICATING CONTINUITY WHEN SET TO 1, IS NEEDED TO CHECK IF THE DATA IN QUESTION IS CONTINUOUS UPON RETURN FROM A THREAD CHANGE THAT HAS OCCURRED. |
| 2 | L | LENGTH | 14 | THIS BIT FIELD INDICATES THE LENGTH OF DATA IN UNITS OF LONG WORDS. A RANGE OF VALUES 0 THROUGH 16 K (0 THROUGH 64 KILOBYTES) MAY BE SET IN THIS FIELD. FOR COMMAND TRANSFER, THE SETTING IS EITHER 4 OR 8 (16 OR 32 BYTES). |
| 3 | S | SIGN | 1 | THIS BIT INDICATES COMMAND TRANSFER WHEN SET TO 1. |
| 4 | B | BROADCAST | 1 | THIS BIT INDICATES BROADCAST TRANSFER WHEN SET TO 1. |
| 5 | P | PROCESS NO. | 6 | THIS BIT FIELD INDICATES THE UNIT OF PROCESSING BY EACH OF MULTIPLE PROCESSORS CONFIGURED AND IS USED TO MAINTAIN PROCESS SEQUENCE. THE PROCESS NUMBER STARTS FROM 0 AND IS INCREMENTED BY 1 UP TO 63 (DECIMAL), WHICH IS FOLLOWED BY 0. |
| 6 | M | MAIN GE | 3 | THIS BIT FIELD IS USED ILLUSTRATIVELY WHEN ANY TWO OVERLAPPING POINTS BETWEEN CONTINUOUS POLYGONS DIVIDED INTO GEOMETRIES TO BE GRAPHICALLY PROCESSED ARE TRANSFERRED. A NUMBER SET IN THIS FIELD INDICATES A MAIN GEOMETRY REPRESENTED BY PREVIOUSLY RECEIVED POINT DATA. |
| 7 | A | ADDRESS | 14 | THIS BIT FIELD ACCOMMODATES A COMMAND REGION TOP RELATIVE ADDRESS INSIDE AN SBB SPACE WRITTEN BY THE HOST. FOR THE MAIN GEOMETRY, THIS FIELD INDICATES A COMMAND TYPE. |
| 8 | D | OVERLAP | 1 | THIS BIT INDICATES OVERLAP TRANSFER WHEN SET TO 1. |
| 9 | R | RESERVED | 22 | SELF-EXPLANATORY |

PARALLEL PROCESSING METHOD FOR USE WITH GRAPHICS PROCESSOR

BACKGROUND OF THE INVENTION

The present invention relates to a method for parallel processing with a graphics processor and, more particularly, to a parallel processing method for use with a graphics processor wherein geometry processing is carried out at high speed by a plurality of processors.

Conventional parallel processing techniques have generally involved distributing a plurality of data items among a plurality of processors for parallel processing thereby. One such technique is disclosed illustratively in Japanese Patent Laid-Open No. Hei 4-330513. The disclosed technique is shown having a plurality of disk drives store via a plurality of data buffers the data supplemented by serial numbers in units of bytes. For a data read-out operation, the serial numbers are used to control the sequence of data processing thereby detecting any data error that may have occurred. The disclosed technique is effective for sequence control of the data whose size is defined in predetermined units such as bytes. The technique is effective for sequence control where the number of data items to be stored coincides with the number of data items to be retrieved, i.e., where the data count before processing equals the data count after processing. Furthermore, the conventional technique is readily implemented for high-speed operation by hardware thanks to its simple algorithms.

Meanwhile, Japanese Patent Laid-Open No. Hei 5-266201 discloses a technique for sequence control of a general-purpose multiprocessor system in which the data used is variable in length. The disclosed technique adopts a scheme in which sequence control of an array of graphics command groups (simply called command groups hereunder) is managed by a dispatch table used as a global memory to accommodate the command groups. In operation, a free processor processes the next command group by referencing the dispatch table in which the command groups are set. Every time a given command group has been read out and processed, a "processing complete" flag is set in the dispatch table. The command groups are thus processed one after another by the processors sharing the processing load in a distributed manner.

The technique disclosed in Japanese Patent Laid-Open No. Hei 4-330513 is apparently inappropriate for use in graphics processing. One reason is that the lengths of commands are not fixed in graphics processing. Another reason is that the number of command data before geometry processing often does not coincide with the number of data after geometry processing, illustratively because ranges of points can be increased or decreased by clipping. The technique disclosed in Japanese Patent Laid-Open no. Hei 5-266201 entails overheads in reading data from the dispatch table and in controlling such read-out operations. In particular, the fact that read-out operations frequently occur makes the technique unfit for systems wherein pipeline processing is consistently resorted to.

SUMMARY OF THE INVENTION

It is therefore an object of the present invention to provide a parallel processing method for use with a graphics processor wherein graphics processing is performed without the need to become aware of the number of command processors and wherein geometry processing is efficiently executed in a distributed manner.

In carrying out the invention and according to one aspect thereof, there is provided a parallel processing method for distributing, via FIFO queues, variable-length command groups from a host CPU to a plurality of parallelly arranged command processors in accordance with the free-busy status of the input FIFO queue corresponding to each of the command processors, wherein the command groups are processed parallelly by the command processors. More specifically, the command groups from the host CPU are distributed to the command processors as follows: the distributing operation is carried out via an input FIFO queue corresponding to each processor and according to the free-busy status information held in that queue. Any free command processor is fed with a group of commands having the same serial number attached to the component commands in that group, the command processor whereupon proceeding to execute successively the commands. The results of the processing of individual graphics command groups from various command processors are collected via an output FIFO queue corresponding to each processor in the order of the command group serial numbers. After being collected in this manner, the results of the processing are graphically drawn.

Further objects and advantages of this invention will become apparent from a consideration of the drawings and ensuing description of it.

BRIEF DESCRIPTION OF THE DRAWINGS

FIGS. 2A and 2B are views depicting the flow of data in effect when continuous polygons are drawn;

FIGS. 3A and 3B are views schematically showing an API-driver interface and a driver hardware interface respectively;

FIG. 4 is a view illustrating how a packet header is generated when parameter data is established;

FIG. 5 is a schematic view of a packet header format along with a table describing the bit configuration of the format;

DETAILED DESCRIPTION OF THE PREFERRED EMBODIMENT

Figure 1:
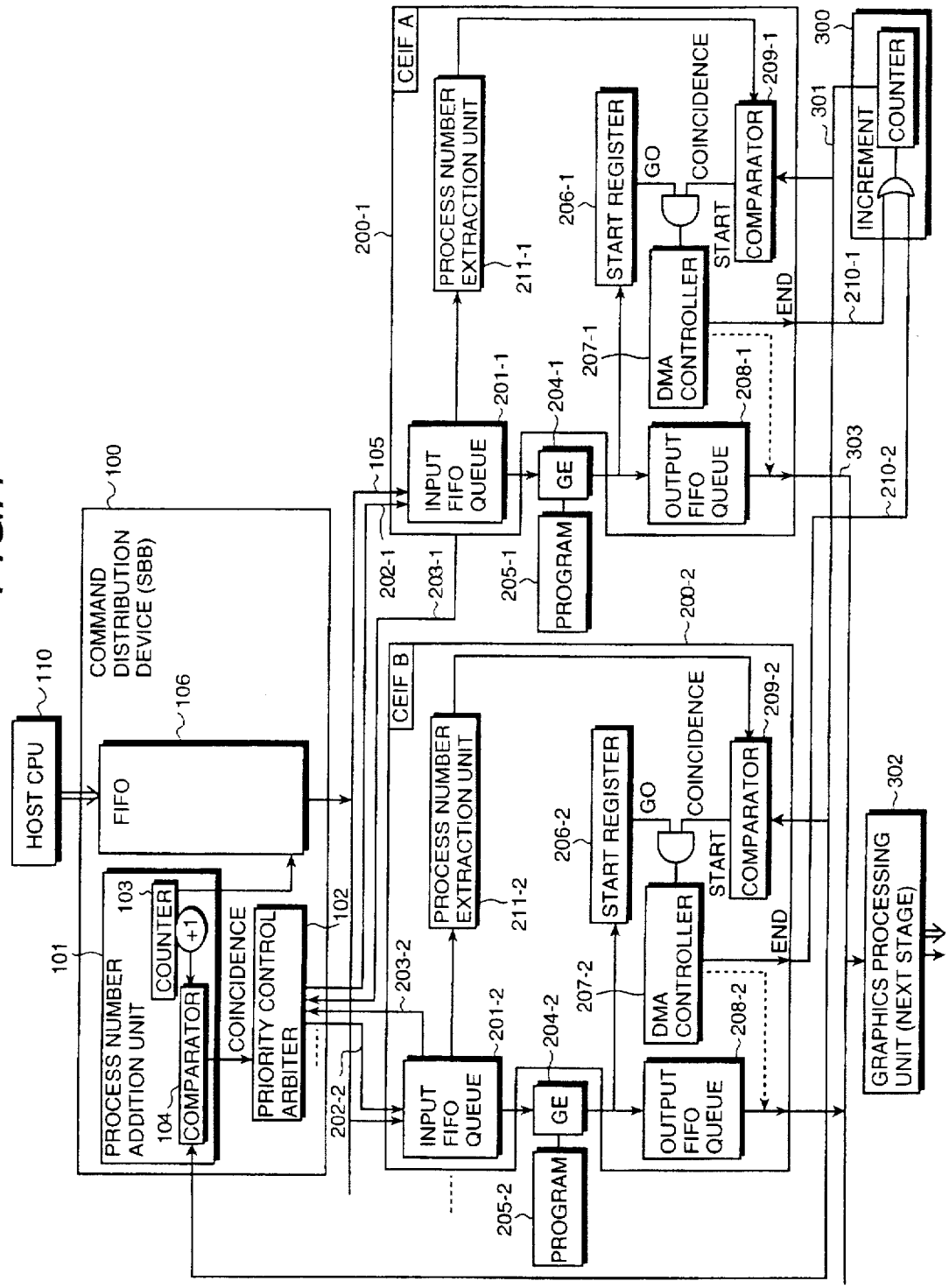
FIG. 1 is a block diagram outlining the constitution of a graphics processor practiced as an embodiment of the invention.

A typical constitution of the graphics processor embodying the invention is shown in FIG. 1. Although the graphics processor as embodied in this example includes two command processors that actually execute graphics commands generated by a host CPU 110, the number of command processors is not limited to two; more processors may generally be utilized. The workings of the graphics processor will be described below in connection with a process of drawing continuous polygons. The polygon, which by definition is a closed plane figure bound usually by straight lines, is assumed to be a triangle in the description that follows. Since graphics processing of continuous polygons is based on that of noncontinuous polygons, the latter processing will be readily understood from a description of how continuous polygons are graphically processed.

The graphics processor works as follows: a host CPU 110 first writes a graphics command (simply called a command hereunder) as data to an FIFO queue 106 inside a command distribution device (SBB) 100. A header is then generated for the command, and the header and the command are paired to create a packet (command). The header is composed of two elements: a command region top relative address A inside an SBB space written by the host CPU 110 (see the header format in FIG. 5), and a count value from a serial ring counter 103 inside a process number addition unit 101. The serial ring counter 103 is a six-bit counter (64-based counter) that counts up from 0 under a count-up instruction from the host CPU 110. The value on the serial ring counter 103 represents a command group serial number, which will be called a process number PNO hereunder. The count-up instruction issued by the host CPU 110 is prepared by dividing the mapping space of the data to be sent from the host CPU to the SBB. Details of packet generation will be described later. The process number PNO is used as a key in controlling the sequence of command group processing by the graphics processor.

A priority control arbiter 102 selects one of input FIFO queues 201-1 and 201-2, whichever is free, according to free-busy status information 203-1 and 203-2 held by these queues inside geometry processing interfaces (GEIFA, GEIFB) 200-1 and 200-2. The packet generated as described above is then written by the priority control arbiter 102 to the selected input FIFO queue 201-2 or 201-2 via an MS bus 105. To which input FIFO queue the data is to be written is controlled by a write enable signal 202-1 or 202-2 from the priority control arbiter 102. If the two input FIFO queues are both free and any one of them is available for a data write operation, the selection of either input FIFO queue is carried out as per the round robin algorithm. If the two input FIFO queues are both busy, the write operation will not be performed until after one of them becomes free. If the packet needs to be written simultaneously to both input FIFO queues 201-1 and 201-2, the free-busy status information 203-1 and 203-2 is checked to see if the two input FIFO queues are free. When the two input FIFO queues are found to be free, the packet is transferred and written simultaneously thereto. Generally, where the input FIFO queues 201-1 and 201-2 are designed to have large storage capacities, geometry processing units (GE) 204-1 and 204-2 are able to read packets more consecutively from the two queues for processing.

As described, the writing of packets to the input FIFO queues 201-1 and 201-2 is controlled by the priority control arbiter 102. The priority control arbiter 102 operates so that the number of packets held in the geometry processing interfaces 200-1 and 200-2 will not exceed a maximum number of packets that may be expressed by the counter 103.

The results of processing of each packet by the geometry processing units 204-1 and 204-2 are output onto a GP2 bus 303 as graphics commands via output FIFO queues 208-1 and 208-2 in the order of their process numbers PNO. These graphics commands are processed by a graphics processing unit 302 in the next stage. Every time the reading of the results of processing from each of the output FIFO queues 208-1 and 208-2 is terminated, a six-bit serial ring counter (64-based counter whose initial count value is the same as that of the counter 103) inside a GP2 bus arbiter 300 is incremented by 1. The count value 301 from this counter and the process number PNO from the counter 103 are compared by a comparator 104 inside the process number addition unit 101. The comparison allows the priority control arbiter 102 to control the number of packets held in the geometry processing interfaces 200-1 and 200-2.

After a plurality of packets having the same process number PNO are written successively to the input FIFO queues 201-1 and 201-2, the process number PNO added to the packages is extracted and retained by packet number extraction units 211-1 and 211-2. The packets are then read out consecutively by the geometry processing units 204-1 and 204-2 and are subjected to geometry processing such as coordinate transformation and clipping by programs 205-1 and 205-2. The results of the processing are retained temporarily in the output FIFO queues 208-1 and 208-2 as graphics commands.

When the results of the processing of all packets having the same process number PNO have been stored temporarily in the output FIFO queues 208-1 and 208-2, the geometry processing units 204-1 and 204-2 write transfer word counts to DMA controllers 207-1 and 207-2 respectively, whereby start registers 206-1 and 206-2 are set to a DMA start state. That is, where comparators 209-1 and 209-2 detect a match between the process number PNO from the process number extraction units 211-1 and 211-2 and the count value 301 from the counter inside the GP2 bus arbiter 300, setting the start registers 206-1 and 206-2 to the DMA start state causes all processed results to be read from the output FIFO queues 208-1 and 208-2 under read control by the DMA controllers 207-1 and 207-2. The processed results thus read out are sent via the GP2 bus 303 to a graphics processing unit 302 in the next stage. Every time a read operation of processed results from the output FIFO queues 208-1 and 208-2 is completed, process end signals 210-1 and 210-2 from the DMA controllers 207-1 and 207-2 cause the counter in the GP2 bus arbiter 300 to be incremented by 1, and the DMA start state of the start registers 206-1 and 206-2 is canceled.

Figure 6:
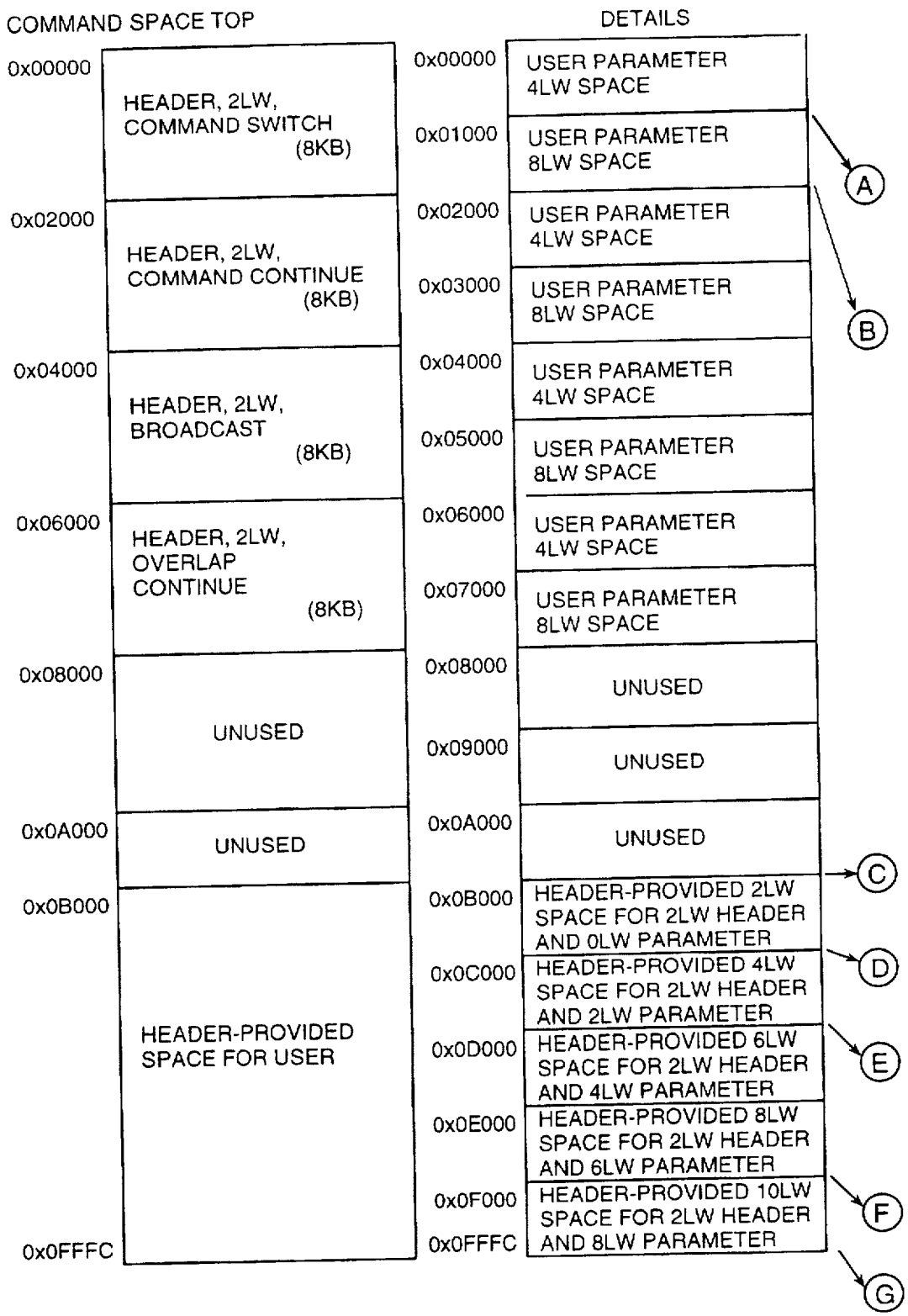
FIG. 6 is a partial view showing how a packet is generated in a command space as viewed from a host CPU.
Figure 7:
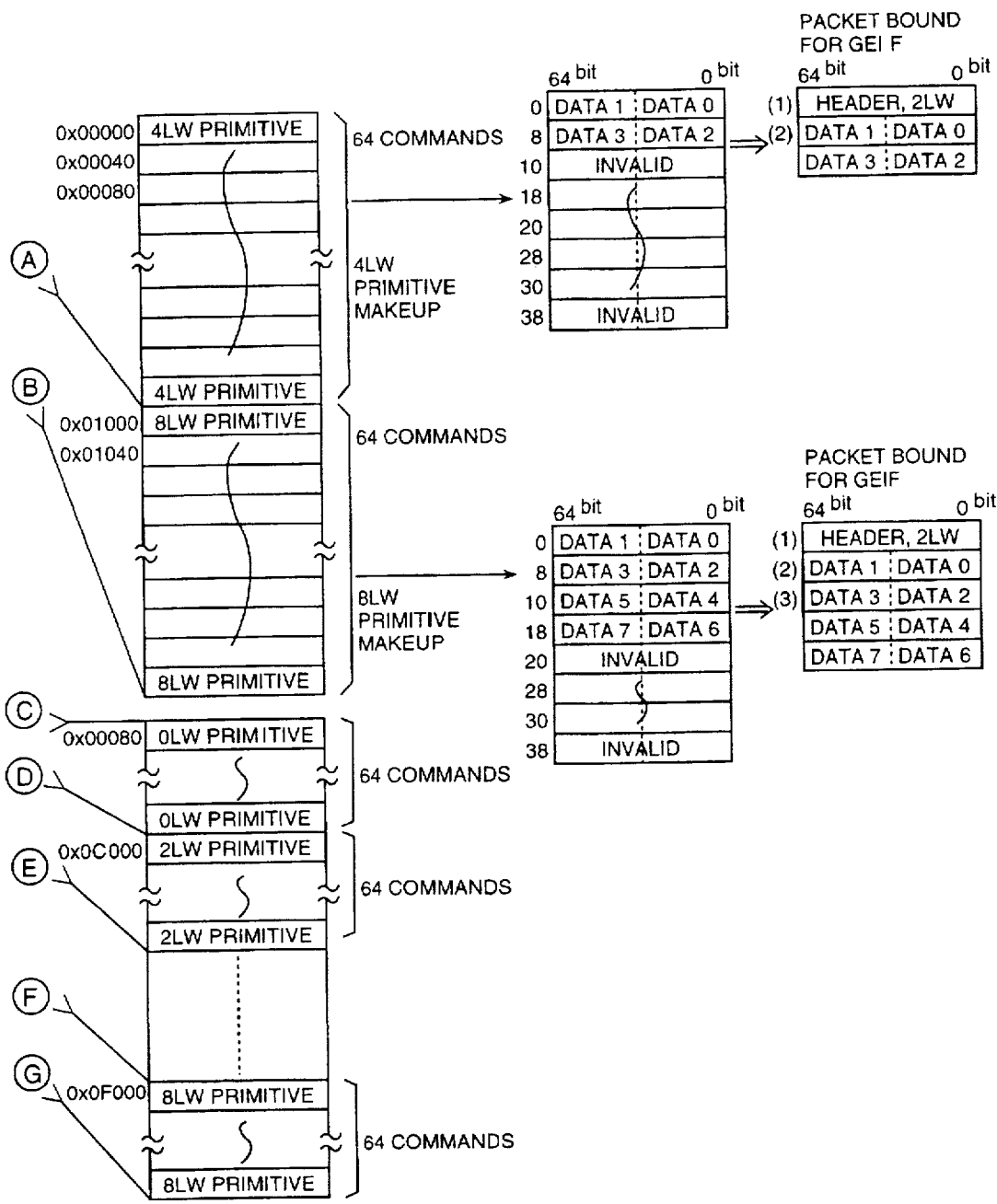
FIG. 7 is another partial view depicting how a packet is generated in the command space as viewed from the host CPU.

So far, the constitution of the graphics processor embodying the invention and its workings have been outlined. What follows is a description of an example in which continuous polygons are drawn, and the flow of data in the processing will be explained with reference to FIGS. 2A, 2B and 3A through 7. FIG. 2A shows continuous polygons to be drawn, and FIG. 2B depicts the flow of data in effect when the continuous polygons of FIG. 2A are being drawn. FIGS. 3A and 3B illustrate an API-driver interface and a driver hardware interface. FIG. 4 sketches an image of how a packet header is generated when parameter data is established. FIG. 5 indicates a typical packet header format. FIGS. 6 and 7 show how packets are illustratively generated in the command space as viewed from the host CPU.

Suppose that triangles constituted by a range of points 0 through 3 (each number shown encircled) in FIG. 2A are processed by the geometry processing interface 200-1, and that triangles made of a range of points 2 through 5 (numbers also shown encircled) are processed by the geometry processing interface 200-2. In such a case, as depicted in FIG. 3A, the host CPU 110 first transfers to the API (application interface) a command BEGIN (polygon) indicating the beginning of continuous polygons, followed by data points 0 through 5 passed on to the software driver of the SBB 100. Finally comes a command END (polygon) ordering the software driver to end the continuous polygons. The data points 0 through 5 are defined with coordinate data $V_x$, $V_y$ and $V_z$ in 12 bytes (=4 bytes×3), with normal vector data $N_x$, $N_y$ and $N_z$ in 12 bytes (=4 bytes ×3), and with textures s and t in 8 bits (=4 bytes×2). As shown in FIG. 3B, it is assumed that the points 0 through 5 are constituted as 32-byte data per point. The software driver of the host CPU 110 issues the command BEGIN (polygon) specifying that the figure to be constituted by the parameter data be made of continuous polygons. Since the command BEGIN (polygon) has no parameter data, each packet may be represented by a header alone. In this example, however, each packet is generated with four long words (one word is 4 bytes long) of dummy data added thereto. The packet corresponding to the command BEGIN (polygon) needs to be sent to each of the geometry processing interfaces 200-1 and 200-2. For this reason, the priority control arbiter 102 checks the free-busy status information 203-1 and 203-2 to see if the input FIFO queues 201-1 and 201-2 are both free, and then transfers and writes the packet in question to the input FIFO queues 201-1 and 202-2 when they are found to be free (the transfer-and-write operation is called a broadcast transfer operation).

The software driver of the host CPU 110 accesses a broadcast space in the address map to notify the hardware of the broadcast transfer operation, and then carries out that operation. At this time, the driver turns on the bit B indicating broadcast transfer in the packet header shown in FIG. 5. Upon broadcast transfer, the packet is also furnished with a process number PNO. Illustratively, a process number PNO of 63 is written to the packet header before the packet is transferred and written to the input FIFO queues 201-1 and 201-2.

The parameter data about the points 0 through 3 are transferred and written successively to the input FIFO queue 201-1 as follows: the software driver of the host CPU 110 first sends the data about the point 0 to one of the geometry processing interfaces and writes the data to a mapping space where the process number PNO (0 in this example) is updated. This sets the parameter data about the point 0 in the command distribution device 100. In the command distribution device 100, the counter 103 is incremented by 1. A value 0 is embedded as the process number into the header of the packet corresponding to the point 0. The priority control arbiter 102 transfers and writes the packet corresponding to the point 0 to the input FIFO queue 201-1 (the transfer-and-write operation is called a command switch operation). Next, the software driver of the host CPU 110 sends the parameter data about the point 1 to the same destination to which the parameter data about the point 0 has been transferred and written, and writes the data to a mapping space where the process number PNO is not incremented. This sets the parameter data about the point 1 in the command distribution device 100. In the command distribution device 100, the counter 103 is not incremented, and the same process number 0 as before is embedded into the header of the packet corresponding to the point 1. Continuity to the preceding packet is indicated by a C (continue) bit being turned on in the packet header. The priority control arbiter 102 transfers and writes the packet corresponding to the point 1 to the input FIFO queue 201-1 (the transfer-and-write operation is called a command continue operation). Thereafter, the software driver of the host CPU 110 sends the parameter data about the point 2 to the same destination to which the parameter data about the point 1 has been transferred and written, and writes the data to a mapping space in which the process number PNO is not incremented and which designates an overlap transfer of the data to another destination different from the preceding destination for the point 1. This sets the parameter command about the point 2 in the command distribution device 100. In the command distribution device 100, the counter 103 is not incremented, and the same process number 2 as before is embedded in the header of the packet corresponding to the point 2. In the packet header, the C bit and a D (double) bit are turned on. In addition, the number of the destination to which the parameter data about the points 0 and 1 have been transferred and written is set to a bit field M in the packet header. The priority control arbiter 102 transfers and writes the packet corresponding to the point 2 simultaneously to the input FIFO 201-1 and 201-2 (the transfer-and-write operation is called an overlap transfer operation). When the overlap transfer operation is carried out, the geometry processing interface 200-1 finds that its own GEIF number coincides with the value embedded in the M field in the packet. As a result, the process number extraction unit 211-1 extract the process number PNO (=0) and retains it. The other geometry processing interface 200-1 finds that its own GEIF number fails to match thee value in the M field of the packet. Thus the process number PNO of the packet is incremented by 1, and the process number extraction unit 211-2 extracts the incremented process number (=1) and retains it. The operations by the process number extraction units 211-1 and 211-2 to extract and retain the process number PNO may be taken over alternatively by the programs 205-1 and 205-2.

The workings involved with the packet corresponding to the point 2 also apply to the ensuing packet corresponding to the point 3. That is, with the process number PNO taken as 0, an overlap transfer operation of the packet corresponding to the point 3 takes place. Regarding the next point 4, the software driver of the host CPU 110 sends the parameter data about that point as a new command group to one geometry processing interface, and updates the process number PNO. That is, the software driver sets the parameter data about the point 4 in the command distribution device 100 by writing the data to a mapping space where the counter 103 is incremented. In the command distribution device 100, the counter 103 is incremented, and the process number 1 is embedded into a bit field P of the packet header. Since the free-busy status information 203-1 and 203-2 of the input FIFO queues 201-1 and 201-2 indicates that the preceding command groups have been written to the input FIFO queue 201-1, the packet corresponding to the point 4 is transferred and written to the input FIFO queue 201-2. The next point 5 is processed by the same procedure used for the packet corresponding to the point 1 with respect to the packet corresponding to the point 0. That is, the packet corresponding to the point 5 (PNO=1) is transferred and written to the input FIFO 201-2 following the packet corresponding to the point 4. Finally, as with the command BEGIN (polygon), a broadcast transfer operation is performed to transfer and write the command END (polygon) simultaneously to all input FIFO queues 201-1 and 201-2. The same method above may be applied to more complex continuous polygons for high-speed graphics processing.

More about the embodiment will now be described with reference to FIGS. 4 through 7. The driver of the host CPU 110 first changes and sets in a command space the address to which to write parameter data depending on the command type. The hardware embeds into the packet the relative address A at the top of the command space. FIG. 4 shows an image of how the packet header is generated. The address A allows the programs 205-1 and 205-2 of the geometry processing units 204-1 and 204-2 to identify what kind of command the host CPU 110 has sent in. This feature is effective in reducing the number of data to be transferred because the bus connecting the host to the SBB 100 is relatively slow in transmission rate. The headers of the packets bound for the geometry processing interfaces (GEIF) 200-1 and 200-2 are automatically generated by hardware, and are added to the command data.

FIG. 5 details how the data point size is embedded in a bit field L (long word length) of the packet, with the B and P bit fields indicating broadcast transfer and process number PNO respectively, among others. FIGS. 6 and 7 illustrate ways in which the software driver of the host CPU 110 uses the command space selectively. The command space comprises user parameter spaces each having 64 regions in which to set parameters of four long words (4LW) and eight long words (8LW), and user header-equipped spaces. Each of 4LW primitives shown in FIG. 7 means a space which, when a 4LW user parameter is written thereto, causes a header to be generated and prompts the SBB 100 to transfer the packet in question to the GEIF. Each 8LW primitive means a space which, when an 8LW user parameter is written thereto, causes a header to be generated and prompts the SBB 100 to transfer the packet to the GEIF. That is, when the software of the host CPU 110 accesses a 4LW space in the command space, packets are generated in units of the written 4LW data; when the software of the host CPU 110 accesses an 8LW space, packets are generated in units of the 8LW data. As depicted in FIG. 6, the actions involved are grouped into such types as command switch, command continue, broadcast and overlap continue according to the command space address.

As described, the host computer may carry out graphics processing without becoming aware of the number of configured processors and free of resource management. Furthermore, the plurality of processors are allowed to perform geometry processing efficiently in a distributed manner.

As many apparently different embodiments of this invention may be made without departing from the spirit and scope thereof, it is to be understood that the invention is not limited to the specific embodiments thereof except as defined in the appended claims.

FIGS. 1, 2B
110) Host CPU
100) Command distribution device (SBB)
101) Process number addition unit
103) Counter
104) Comparator
a) Coincidence
102) Priority control arbiter
201-2, 201-1) Input FIFO queue
211-2, 211-1) Process number extraction unit
205-2, 205-1) Program
206-2, 206-1) Start register
207-2, 207-1) DMA controller
b) Start
c) End
208-2, 208-1) Output FIFO queue
209-2, 209-1) Comparator
302) Graphics processing unit (next stage)
d) Increment
e) Counter
FIG. 3A
　API-driver interface
　　BEGIN (polygon)
　　　Point 0 (. . .) . . .
　　END (polygon)
FIG. 3B
　Driver hardware interface
　Point 5 data in 32 bytes
　Point 1 data in 32 bytes
FIG. 4
1) Command region inside SBB space
2) Command space top+0x0000
3) Access from host to store
4) Data
5) Packet bound for GEIF
6) Header
7) 32-bit image
FIG. 5
1) Packet header format
2) Bit abbreviation
3) Bit name
4) Bit width
5) Description
6) Continue
7) This bit, indicating continuity when set to 1, is needed to check if the data in question is continuous upon return from a thread change that has occurred.
8) Length
9) This bit field indicates the length of data in units of long words. A range of values 0 through 16K (0 through 64 kilobytes) may be set in this field. For command transfer, the setting is either 4 or 8 (16 or 32 bytes).
10) Sign
11) This bit indicates command transfer when set to 1.
12) Broadcast
13) This bit indicates broadcast transfer when set to 1.
14) Process No.
15) This bit field indicates the unit of processing by each of multiple processors configured and is used to maintain process sequence. The process number starts from 0 and is incremented by 1 up to 63 (decimal), which is followed by 0.
16) Main GE
17) This bit field is used illustratively when any two overlapping points between continuous polygons divided into geometries to be graphically processed are transferred. A number set in this field indicates a main geometry represented by previously received point data.
18) Address
19) This bit field accommodates a command region top relative address inside an SBB space written by the host. For the main geometry, this field indicates a command type.
20) Overlap
21) This bit indicates overlap transfer when set to 1.
22) Reserved
23) Self-explanatory
FIG. 6
1) Command space top
2) Header, 2LW , command switch
3) Header, 2LW , command continue
4) Header, 2LW , broadcast
5) Header, 2LW , overlap continue
6) Unused
7) Header-provided space for user
8) Details
9) User parameter 4LW space
10) User parameter 8LW space
11) Header-provided 2LW space for 2LW header and 0LW parameter
12) Header-provided 4LW space for 2LW header and 2LW parameter
13) Header-provided 6LW space for 2LW header and 4LW parameter
14) Header-provided 8LW space for 2LW header and 6LW parameter
15) Header-provided 10LW space for 2LW header and 8LW parameter
FIG. 7
1) 4LW primitive
2) 54 commands
3) 4LW primitive makeup
4) Data 1

5) Invalid
6) Packet bound for GEIF
7) Header, 2LW
8) 8LW primitive makeup

What is claimed is:

1. A parallel processing method for use with a graphics processor having a plurality of graphics command processors for parallelly processing a plurality of graphics commands from a host processor, said parallel processing method comprising the steps of:

distributing a command group made of said plurality of graphics commands via a first first-in-first-out queue to a second first-in-first-out queue corresponding to each of said plurality of graphics command processors arranged in parallel;

when said command group is distributed from said first first-in-first-out queue to said second first-in-first-out queues, adding an identical serial number as a command group serial number to each of said plurality of graphics commands constituting said command group to be processed by the command graphics processor corresponding to any second first-in-first-out queue which is found to be free in accordance with free status information about said second first-in-first-out queues;

collecting the results of processing of said graphics commands by said graphics command processors into a third first-in-first-out queue corresponding to each of said graphics command processors in the order of command group serial numbers added to the commands; and drawing graphically the collected results of graphics command processing.

2. A parallel processing method for use with a graphics processor according to claim 1, further comprising the steps of:

performing a direct memory read operation of said collected results of graphics command processing held temporarily in said third first-in-first-out queues, when there occurs a coincidence between a value of a counter incremented by 1 every time a direct memory access read operation on any one of said third first-in-first-out queues has ended, on the one hand, and the command group serial number held by any one of said graphics command processors, on the other hand; and reading said results of graphics command processing by each graphics command processor in the order of said command group serial numbers.

3. A parallel processing method for use with a graphics processor according to claim 2, further comprising the step of comparing the value of said counter and the command group serial number added to the command group output by said first first-in-first-out queue so as to keep within a predetermined count the number of command groups to be processed by said graphics command processors.

* * * * *